United States Patent
Sakata et al.

[11] Patent Number: 6,152,394
[45] Date of Patent: Nov. 28, 2000

[54] SOUND-ABSORBING MATERIAL AND A CABLE REEL INCLUDING THE SAME

[75] Inventors: Tomoyuki Sakata, Nagoya; Tetsuya Iizuka; Akihito Maegawa, both of Yokkaichi, all of Japan

[73] Assignees: Sumitomo Wiring Systems, Ltd.; Harness System Technologies Research, Ltd.; Sumitomo Electric Industries, Ltd., all of, Japan

[21] Appl. No.: 09/129,709

[22] Filed: Aug. 5, 1998

[30] Foreign Application Priority Data

Aug. 8, 1997 [JP] Japan .................................. 9-215102

[51] Int. Cl.[7] ............................ B65H 75/38; H01R 39/00
[52] U.S. Cl. ............................................... 242/388; 439/15
[58] Field of Search .............................. 428/317.1, 317.7, 428/317.9, 318.4, 319.3, 496; 242/388; 439/15; 181/284, 288, 290, 294, 295

[56] References Cited

U.S. PATENT DOCUMENTS

| | | | |
|---|---|---|---|
| 3,276,944 | 10/1966 | Levy | 442/378 |
| 4,567,097 | 1/1986 | Yazaki et al. | 428/317.7 |
| 5,584,950 | 12/1996 | Gaffigan | 156/71 |
| 6,007,890 | 12/1999 | DeBlander | 428/72 |

*Primary Examiner*—Paul Thibodeau
*Assistant Examiner*—Monique R. Jackson
*Attorney, Agent, or Firm*—Bierman, Muserlian and Lucas

[57] ABSTRACT

A sound-absorbing material and a cable reel including the same are produced inexpensively and attenuates sliding noise and vibration noise. A sound-absorbing material 20 comprises a foam rubber 20a and a thin synthetic paper 20b having a smooth surface and laminated through an adhesive 20c on a top surface of the foam rubber 20a. The synthetic paper 20b can be easily attached to the foam rubber 20a by means of the adhesive 20c and is inexpensive in comparison with a conventional polytetrafluoroethylene resin sheet. The sound-absorbing material 20 is attached to a lower bearing surface 12a of a cable containing chamber 12 in a cable reel. The synthetic paper 20b of the sound-absorbing material 20 can attenuate a sliding noise which is generated when a flat cable 15 slides on the lower bearing surface 12a. The foam rubber 20a of the sound-absorbing material 20 can attenuate vibration noise which is generated by collision between a lateral lower edge of the flat cable 15 and the lower surface 12a when the flat cable 15 vibrates axially in the cable containing chamber 12 during driving. The synthetic paper does not interfere with a sound-absorbing function of the foam 20a since the synthetic paper is a low hardness.

2 Claims, 4 Drawing Sheets

SOUND-ABSORBING MATERIAL AND A CABLE REEL INCLUDING THE SAME

BACKGROUND OF THE INVENTION

This invention relates to a sound-absorbing material and a cable reel including the same, and more particularly it relates to a sound-absorbing material preferably adapted to be used in a cable reel which is mounted on a steering device for an automotive vehicle and electrically interconnects a stationary member assembly and a movable member assembly through a flat cable.

In an automotive vehicle equipped with an air bag, a cable reel is provided in a steering wheel in order to supply electrical power to an air bag system. For convenience of explanation, such a cable reel will be described below by referring to the drawings. FIGS. 6A to 6C show an example of a conventional cable reel. FIG. 6A is a schematic longitudinal sectional view of a conventional cable reel. FIG. 6B is a perspective view of a conventional sound-absorbing material. FIG. 6C is a fragmentary cross sectional view of the sound-absorbing material shown in FIG. 6B.

As shown in FIG. 6A, the conventional cable reel includes a movable member assembly 10 which rotates together with a steering wheel, and a stationary member assembly 11 which is secured to a stationary shaft on a body frame. The movable and stationary member assemblies 10 and 11 define an annular cable containing chamber 12 which accommodates a flat cable 15 in a coiled manner. Opposite ends of the flat cable 15 in the coiled manner are connected to lead wires which are led out from the movable and stationary member assemblies 10 and 11, respectively, to be connected to an external connector or electrical wires. In such a cable reel, the flat cable 15 is wound in the cable containing chamber 12 when the steering wheel is turned in either a clockwise or counter clockwise direction while the flat cable 15 is unwound in the chamber 12 when the steering wheel is turned in the other direction, so that a device (air bag) on the steering wheel is electrically connected to a power source on the body frame.

However, the cable reel involves a problem in that an unpleasant sliding noise is generated when the lateral opposite edges of the flat cable 15 slide on upper and lower bearing surfaces of the cable containing chamber 12 upon winding and unwinding of the flat cable 15 in the chamber 12. The flat cable 15 vibrates in an axial direction (from an upper to lower direction or from a lower to upper direction) of the steering wheel during idling or driving of the automotive vehicle, thereby giving rise to an unpleasant vibration noise due to collision between the bearing surfaces of the chamber 12 and the lateral opposite edges of the flat cable 15.

Japanese Utility Model Publication No. HEI 6-36040 (1994) discloses a cable reel in which a highly lubricative sheet such as a polytetrafluoroethylene (PTFE) resin or the like is adhered to at least one of bearing surfaces of a cable containing chamber in order to attenuate sliding noise. Also, Japanese Patent Public disclosure No. HEI 8-104471 (1996) discloses a cable reel in which a sound-absorbing material made of a resilient material such as a rubber or the like or a sound-absorbing material with the polytetrafluoroethylene (PTFE) resin is attached to bearing surfaces of stationary and movable member assemblies by means of clamps provided on the surfaces.

A polytetrafluoroethylene resin sheet is adhered by way of PET (polyethylene terephthalate) to a surface of a rubber sheet since the former lacks adhesion to the latter.

Although the polytetrafluoroethylene resin sheet disclosed in Japanese Utility Model Publication No. HEI 6-36040 (1994) can attenuate the sliding noise due to its high lubrication, it cannot reduce noise which is caused by collision of the flat cable with the bearing surfaces of the cable reel due to axial vibrations of the cable in a coiled state. In particular, such an unpleasant collision noise is likely to be accentuated when an engine is idling. On the other hand, the resilient sheet disclosed in Japanese Patent Public Disclosure No. HEI 8-104471 (1996) only slightly attenuates sliding noise, since the lubrication between the flat cable and the resilient sheet is poor, although the sheet can reduce collision or vibration noise.

In a sound-absorbing material 50 shown in FIG. 6C, a rubber sheet 50a having a polytetrafluoroethylene (PTFE) resin sheet 50c provided thereon can attenuate and absorb sliding noise and vibration noise by means of a highly lubricative resin and rubber sheet.

As shown in FIG. 6B, however, a rubber sheet 50a, a polyethylene terephthalate (PET) film 50b and a polytetrafluoroethylene (PTFE) resin sheet 50c must be punched out into an annular shape adapted to be used, since the bearing surfaces of the cable containing chamber 12 is in an annular form. Consequently, this involves much loss of material. In particular, a total cost of the cable reel becomes high since the PTFE resin sheet is expensive.

In addition, the above sound-absorbing material involves a high cost due to an increase in working steps, since the PET film 50b is adhered to the rubber sheet 50a through an adhesive and then the PTFE resin sheet 50c is attached to the PET film 50b by way of an adhesive.

Moreover, the above sound-absorbing material gives rise to a problem in that it reduces a sound-absorbing effect since the hard PET film 50b is interposed between the rubber sheet 50a having a sound-absorbing function and the PTFE resin sheet 50c having a lubricative function. It is difficult to produce the PTFE resin sheet 50c having a low-thickness since it is produced by means of skiving. Consequently, the sheet 50c on the market is usually more than 20 μm. Such a thick PTFE resin sheet 50c in addition to the hard PET film 50b will lower the sound-absorbing function.

SUMMARY OF THE INVENTION

An object of the present invention is to provide a sound-absorbing material and a cable reel including the same which can effectively attenuate both sliding noise and vibration noise and can be produced inexpensively.

In order to achieve the above object, a sound-absorbing material in accordance with the present invention comprises: a resilient base element made of a material selected from a rubber system foam material, a resin system foam material, and a rubber material; and a thin synthetic paper having a smooth surface and laminated on at least a top surface of the resilient base element.

The rubber system foam material is preferably a foam SBR (foam styrene butadiene rubber) or the like. The resin system foam material is preferably a foam polyurethane or the like.

The synthetic paper is produced by mixing a main material made of a polypropylene resin with a reinforcing fiber and by utilizing a method for forming a biaxial extension film. A thickness of the synthetic paper is in a range between 80 μm and 0.1 mm. The synthetic paper is adhered through an adhesive to the top surface or the top and bottom surfaces of the resilient base element.

The synthetic paper (Trade name: YUPO) is made of a polypropylene resin as a main material. The polypropylene resin is mixed with an inorganic filling material and a little amount of an additive. The mixed materials are further mixed with a short fiber, an insulation fiber or the like while forming a number of microvoids (fine cavities) and laminating a smooth surface layer on a formed base layer by means of the biaxial extension film forming method. The synthetic paper has the same superior lubricity as a conventional polytetrafluoroethylene resin sheet and is cheaper than the polytetrafluoroethylene resin sheet. This results in a lower cost.

In the prior art, the polytetrafluoroethylene resin is formed into a sheet beforehand and the resin sheet is attached to a rubber sheet through the hard PET film or the like since it is difficult to adhere the resin sheet to the rubber sheet through an adhesive. Such a hard PET film on the rubber sheet lowers a sound-absorbing effect of the rubber sheet. However, the synthetic paper in the present invention can be easily adhered to the rubber material by way of an adhesive and has a lower hardness in comparison with the PET film.

Accordingly, the synthetic paper does not interfere with a sound-absorbing action of the rubber material and can enhance the sound-absorbing effect. Moreover, the sound-absorbing material of the present invention can eliminate conventional steps for adhering the PET film to the rubber sheet and for adhering the polytetrafluoroethylene resin sheet to the PET film, thereby, greatly reducing working processes.

Also, the synthetic paper is highly durable in terms of friction since a short fiber, insulation fiber or the like is admixed in the synthetic paper.

A cable reel having a sound-absorbing material in accordance with the present invention comprises a stationary member assembly and a movable member assembly rotatably mounted on the stationary member assembly. The stationary and movable member assemblies define a cable containing chamber having an annular configuration and upper and lower bearing surfaces. The cable containing chamber accommodates a flat cable in a coiled manner between the upper and lower bearing surfaces. Opposite ends of the flat cable are led out from the stationary and movable member assemblies through electrical means. The sound-absorbing material comprises a resilient base element made of a material selected from a rubber system foam material, resin system foam material and a rubber material; and a thin synthetic paper having a smooth surface and laminated on at least a top surface of the resilient base element. The sound-absorbing material is attached to at least the lower surface of the cable containing chamber so that the flat cable slides on the sound-absorbing material.

The cable reel described above is attached to a steering device of an automotive vehicle to supply electrical power to an air bag system. When the movable member assembly which rotates with a steering wheel is turned in one direction, the flat cable is wound in the cable containing chamber in the cable reel while the flat cable is unwound when the assembly is turned in the other direction. The lateral opposite edges of the flat cable, in particular, the lateral lower edge which is subject to an empty weight, slide on the bearing surfaces of the cable containing chamber, in particular, the lower bearing surface during rotary motion. Since the synthetic paper having a superior lubricity is attached to the resilient base element of the sound-absorbing material on the bearing surface, the flat cable can rotate smoothly in the cable containing chamber, thereby suppressing generation of sliding noise. Also, even if the flat cable vibrates in the axial direction of the cable reel due to vibration of the engine during an idling mode or a driving mode and the lateral lower edge of the flat cable collides on the lower bearing surface of the cable containing chamber, the unpleasant vibration noise is absorbed by the foam material.

The sound-absorbing material may be formed into an annular shape corresponding to the annular shape of the bearing surface of the cable containing chamber. The sound-absorbing material may include a plurality of straps each having a given width. The straps extend radially and are equally spaced apart from each other in a circumferential direction on the bearing surface of the cable containing chamber.

In the case where the straps of the sound-absorbing material each having a given width are attached so that their radially remote ends are equally spaced circumferentially on the bearing surface, a contact area between the straps and the flat cable becomes small, thereby attenuating sliding noise and vibration noise.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE PREFERRED EMBODIMENTS

Figure 6A:
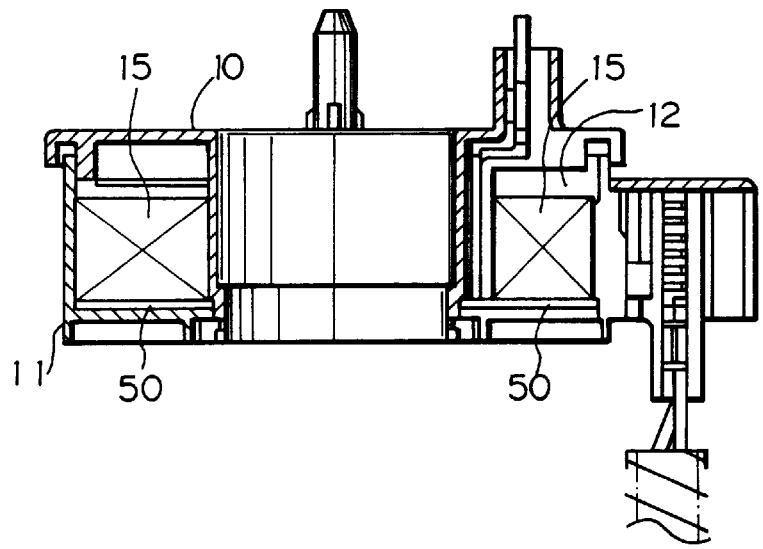
FIG. 6A is a schematic longitudinal sectional view of a conventional cable reel.
Figure 6B:
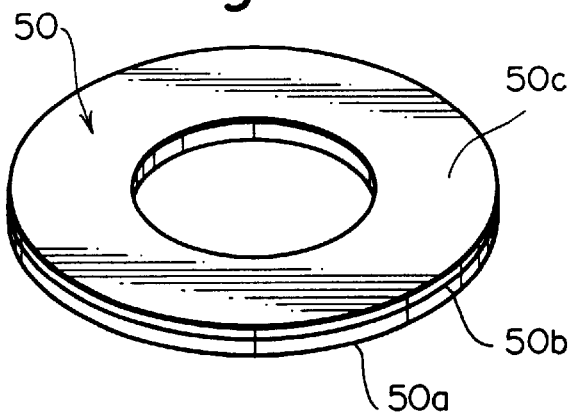
FIG. 6B is a perspective view of the conventional sound-absorbing material.
Figure 6C:
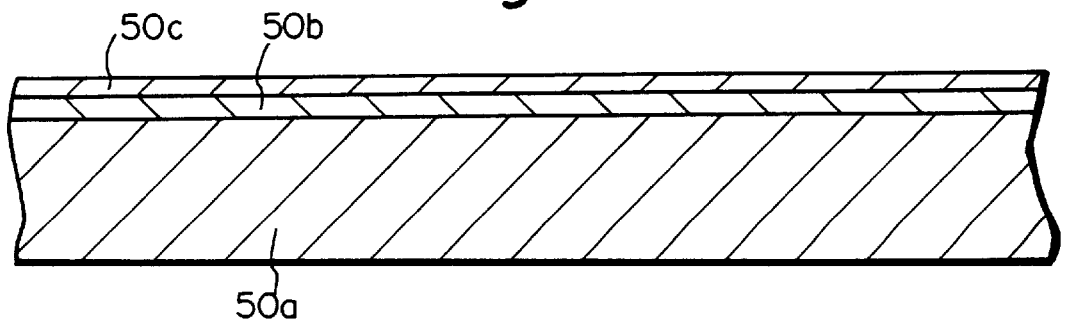
FIG. 6C is a fragmentary enlarged cross sectional view of the conventional sound-absorbing material.

Embodiments of the present invention will be described below by referring to the drawings. The embodiments are directed to a cable reel which includes a sound-absorbing material and is mounted on a steering device in an automotive vehicle. A main body of the cable reel of the present invention has the same structure as that of the conventional cable reel shown in FIG. 6A. In both structures, the same members are indicated by the same reference numbers.

The cable reel of the present invention includes a movable member assembly 10 which is secured to a steering wheel (not shown) to be turned together with it, and a stationary member assembly 11 which is secured to a shaft (not shown) fixed on a body frame. The movable member assembly 10 has an upper wall 10a and an inner peripheral wall 10b while the stationary member assembly 11 has a lower wall 11a and an outer peripheral wall 11b. The movable and stationary member assemblies 10 and 11 define an annular cable containing chamber 12. The cable containing chamber 12 accommodates a flat cable 15 in a coiled manner. An inner end of the flat cable 15 in a coiled manner is connected to a lead wire 13 which is led out through an attaching hole 10c in the upper wall 10a of the movable member assembly 10. An outer end of the flat cable 15 in a coiled manner is connected to a lead wire 14 which is led out from the stationary member assembly 11. The flat cable 15 is wound in the cable containing chamber 12 when the steering wheel is turned in one direction while the flat cable 15 is unwound in the chamber 12 when the steering wheel is turned in the other direction. Thus, the lead wires 13 and 14 are electrically coupled to each other through the flat cable 15, even if the steering wheel is turned in either direction.

Figure 1:
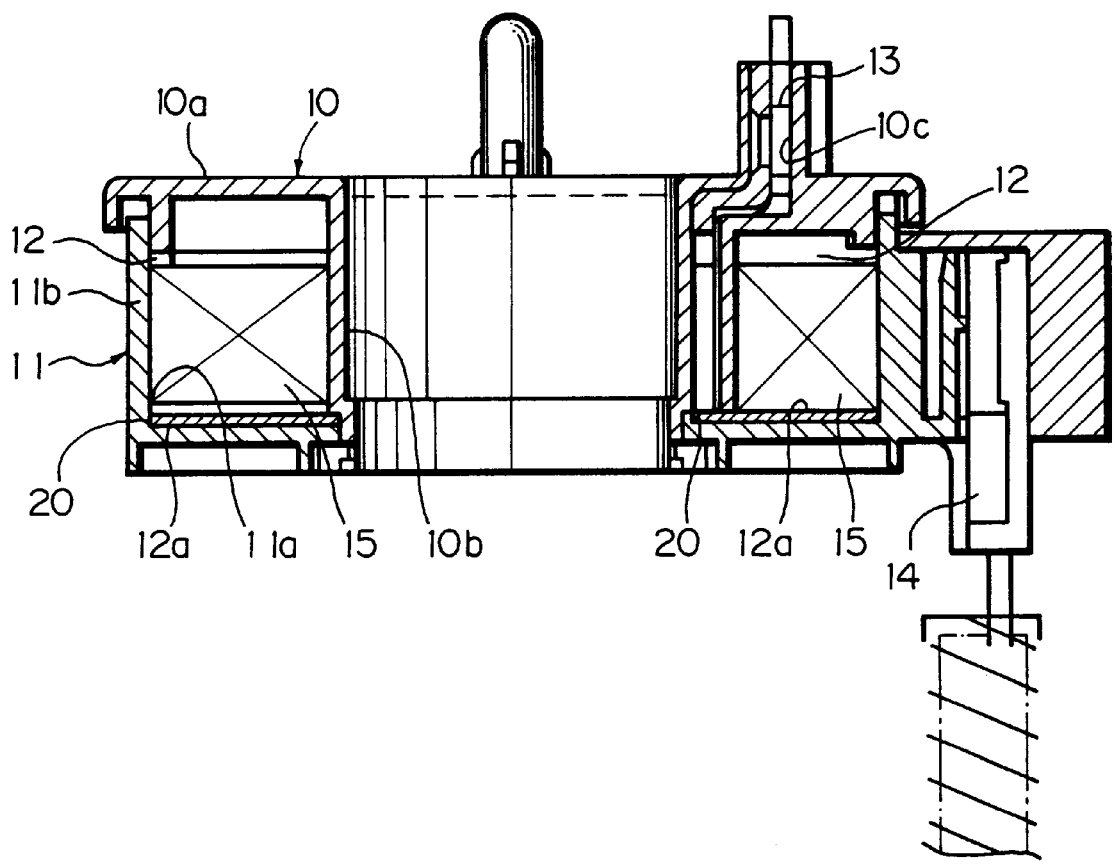
FIG. 1 is a schematic longitudinal sectional view of a cable reel in accordance with the present invention.
Figure 2:
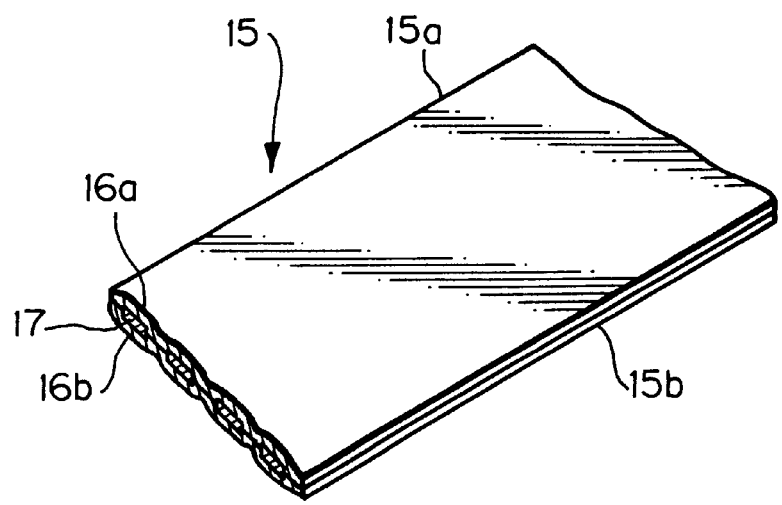
FIG. 2 is a schematic perspective view of a part of a flat cable to be accommodated in a cable containing chamber of the cable reel shown in FIG. 1.
Figure 3:
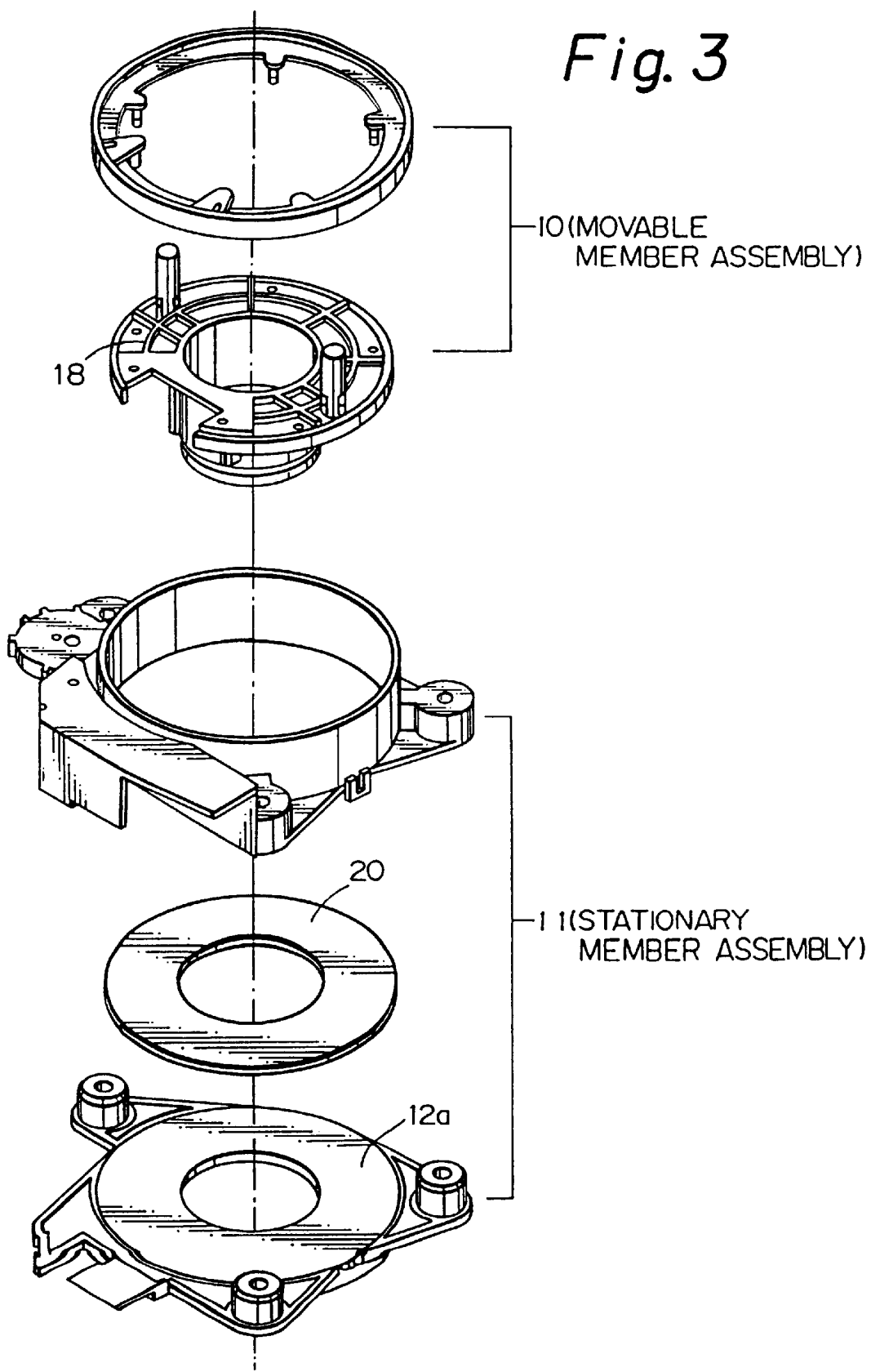
FIG. 3 is an exploded perspective view of the cable reel shown in FIG. 1, illustrating main elements constituting the cable reel.

The flat cable 15, as shown in FIG. 2, includes a pair of insulation resin films 16a and 16b, and a conductive material 17 interposed between the films 16a and 16b. The flat cable 15 is wound and unwound in the cable containing chamber 12 while either one of lateral opposite edges 15a and 15b of the flat cable 15 is sliding on a lower annular flat bearing surface 12a of the cable containing chamber 12. Accordingly, a sound-absorbing material 20 is mounted on the lower bearing surface 12a, as shown in FIG. 3.

On the other hand, the cable containing chamber 12 is provided on the upper wall with a plurality of elongated ribs 18 each of which extends radially and is spaced apart at a given distance in the circumferential direction. There is a slightly small clearance between the ribs 18 and the lateral upper edge 15a of the flat cable 15. Thus, no sliding noise is generated on the upper side in the cable containing chamber 12. The sound-absorbing material 20 may be mounted on the upper flat annular wall of the cable containing chamber 12 without providing the ribs 18 on the wall.

A first embodiment of the sound-absorbing material 20 has an annular shape corresponding to the annular shape of the lower bearing surface 12a of the stationary member assembly 11.

Figure 4:
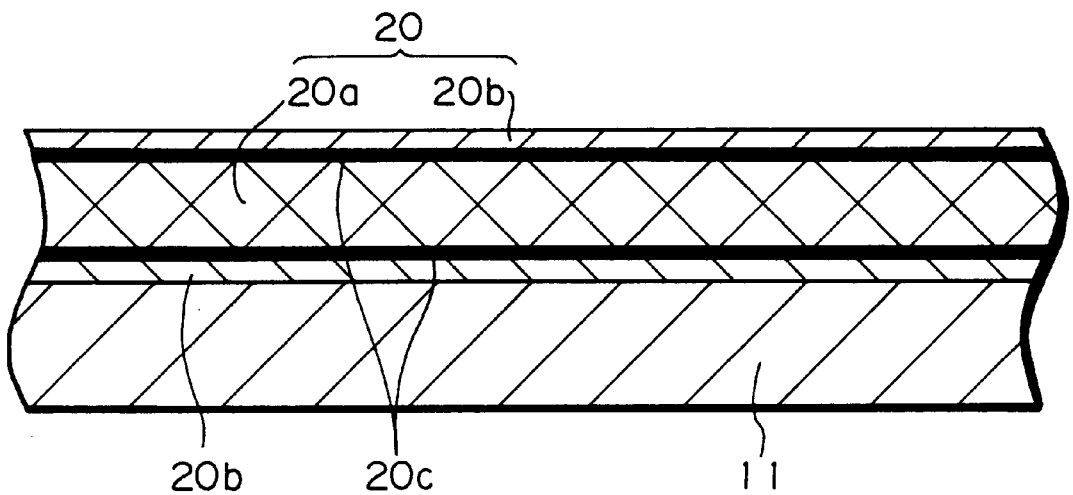
FIG. 4 is a fragmentary enlarged cross sectional view of a first embodiment of a sound-absorbing material in accordance with the present invention.

The sound-absorbing material 20 comprises, as shown in FIG. 4, a resilient base element 20a made of a foam rubber material and two sheets of synthetic paper 20b each of which are attached to top and bottom surfaces of the resilient base element 20a through an adhesive 20c.

The foam rubber constituting the resilient base element 20a is made of an SBR (styrene butadiene rubber) in a liquid form having a given viscosity. The SBR is made by mixing a rubber material with a resolutive or decomposable foaming agent such as an inorganic compound, an azo-compound, a sulfonyl hydrazide compound, or the like. The liquid mixed SBR is applied to the synthetic paper 20b and heated at a foaming temperature (for example, 150° C.) to foam it.

The synthetic paper is produced by mixing a main material made of a polypropylene resin with an inorganic filing material and a little amount of an additive and by further adding a fiber such as a short fiber, an insulation fiber, or the like, and then by forming a number of microvoids (fine cavities) and laminating a smooth surface on the formed base layer by way of the biaxial extension film forming method. The synthetic paper is a so-called YUPO (Tradename) and has a thickness of 80 μm. The synthetic paper has the same superior lubricity as a conventional polytetrafluoroethylene resin sheet. The synthetic paper is highly durable in friction since the fiber described above is mixed in the synthetic paper.

Although the resilient base element 20a of the sound-absorbing material 20 is made of a foam rubber in the above embodiment, the element 20a may be a foam resin such as a foam urethane which is heated and foamed at a desired temperature (e.g. 100° C.) or may be a usual rubber sheet.

Such a synthetic paper 20b is substantially cheaper than a conventional polytetrafluoroethylene resin sheet, thus reducing the cost.

In the prior art, the polytetrafluoroethylene resin is formed into a sheet beforehand and the resin sheet is attached to a rubber sheet through the hard PET film or the like since it is difficult to adhere the resin sheet to the rubber sheet through an adhesive. In accordance with the present invention, however, it is possible to easily adhere the synthetic paper 20b to the resilient base element or foam rubber 20a by way of the adhesive 20c. Moreover, the synthetic paper has a lower hardness in comparison with the PET film. Consequently, the synthetic paper does not interfere with a sound-absorbing action of the foam rubber 20a and can enhance the sound-absorbing effect.

The sound-absorbing material 20 constructed above is secured to a lower bearing surface 12a of the stationary member assembly 11 by an adhesive. A lateral lower edge of the flat cable 15 slides on the synthetic paper 20b, thereby attenuating sliding noise.

When the flat cable 15 vibrates axially and collides on the lower sound-absorbing material 20 to generate tapping noise during an idling mode or a driving mode, the resilient base element or foam rubber 20a attenuates and absorbs tapping noise efficiently.

Consequently, the inexpensive sound-absorbing material 20 can reduce sliding noise as well as vibration noise.

Figure 5:
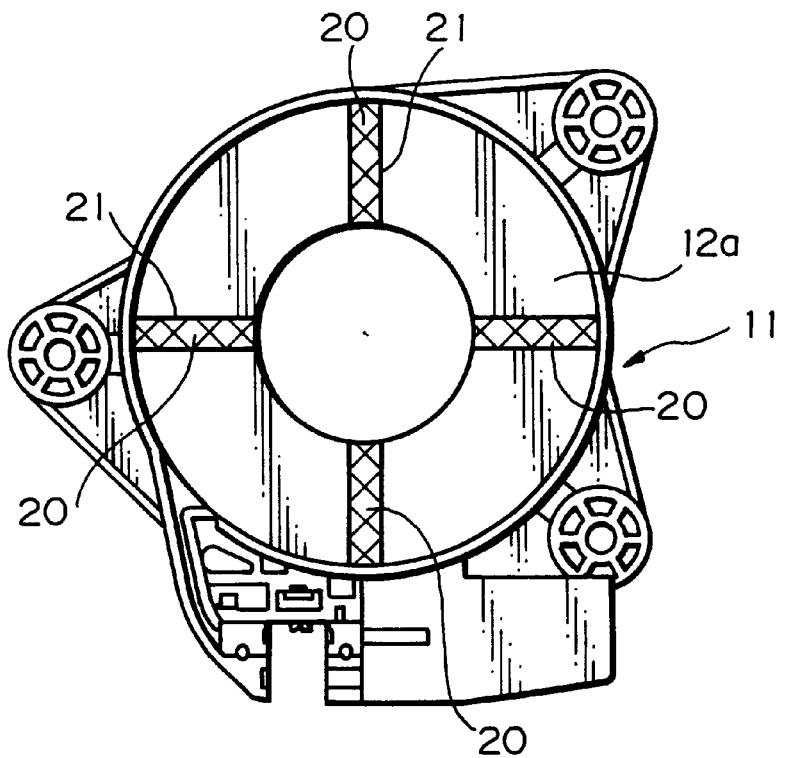
FIG. 5 is a plan view of the cable reel, illustrating a bearing surface of the cable reel on which a second embodiment of a sound-absorbing material is mounted.

FIG. 5 shows a second embodiment of the sound-absorbing material 20 in accordance with the present invention. The cable containing chamber 12 is provided in the lower annular bearing surface 12a with four recesses 21 each of which has a given width, extends radially from an inner periphery to an outer periphery of the bearing surface 12a, and is equally spaced in a circumferential direction of the bearing surface 12a. A liquid rubber material mixed with a foaming agent is filled in each recess 21, and heated at a desired temperature to form a foam rubber 20a with a desired width. Then, a synthetic paper 20b is adhered to the foam rubber 20a by means of an adhesive.

A contact area between the flat cable 15 and the sound-absorbing material 20 becomes small by disposing the sound-absorbing material 20 on a part of the lower annular bearing surface 12a, thereby attenuating sliding noise and vibration noise. The sound-absorbing material 20 hardly comes off from the bearing surface 12a, thereby enhancing an attaching force.

It should be noted that the cable reel of the present invention is not limited to a cable reel to be mounted on a steering device and can be applied to a similar device. It should be also noted that the sound-absorbing material of the present invention is not limited to the case where the material is attached to a bearing surface of the cable reel. The sound-absorbing material may be secured to a place where one member slides on a surface of the other member and both members are subject to vibration, in order to attenuate any noise.

It will be apparent from the foregoing that the sound-absorbing material according to the present invention includes a resilient base element made of a rubber system foam material, a resin system foam material, or a rubber material, and a synthetic paper laminated on at least a top surface of the resilient base element and that the sound-absorbing material can reduce a cost in comparison with a conventional sound-absorbing material in which a conventional polytetrafluoroethylene resin sheet is adhered to a rubber material, since the synthetic paper is inexpensive. The synthetic paper can be easily adhered to the resilient base element by way of an adhesive. On the contrary, the polytetrafluoroethylene resin sheet must be attached through a hard PET film to the rubber material. Consequently, the sound-absorbing material of the present invention does not interfere with a sound-absorbing action of the resilient base element but enhances a sound-absorbing effect.

The present invention can reduce the number of steps for producing the sound-absorbing material, can enhance an efficiency of production, and can lower a cost.

The synthetic paper is very durable in friction by mixing a short fiber or an insulation fiber in the synthetic paper.

When the above sound-absorbing material is applied to a cable reel, the synthetic paper on a bearing surface of the cable reel gives good lubricity to a flat cable, thereby attenuating sliding noise. Even if a lateral lower edge of the flat cable collides on a lower bearing surface by axial vibration of the flat cable upon driving, vibration noise is effectively absorbed by the resilient base element made of a rubber system foam material, a resin system foam material, or a rubber material, thereby attenuating unpleasant vibration noise. Moreover, the synthetic paper has a low hardness and a high adhesion, can be directly attached to the resilient base element, and does not interfere with a sound-absorbing function of the resilient base element. Thus, both sliding noise and vibration noise can be effectively attenuated.

In the case where a plurality of straps of the sound-absorbing material, each having a given width, are attached by an equal angle in a circumferential direction to a bearing surface, a contact area between the flat cable and the bearing surface becomes small, thereby attenuating sliding noise and vibration noise.

From the above description of the invention, those skilled in the art will perceive improvements, changes and modifications. Such improvements, changes and modifications within the skill of the art are intended to be covered by the appended claims.

The entire disclosure of Japanese Patent Application No. HEI 9-215102 (1997) filed on Aug. 8, 1997 including specification, claims, drawings and summary is incorporated herein by reference in its entirety.

What is claimed is:

1. In a cable reel for an automotive vehicle having a sound-absorbing material therein, wherein said cable reel has a stationary member assembly and a movable member assembly rotatably mounted on said stationary member assembly, said stationary and movable member assemblies defining a cable containing chamber having an annular configuration and upper and lower bearing surfaces, said cable containing chamber accommodating a flat cable in a coiled manner between said upper and lower bearing surfaces, opposite ends of said flat cable being led out from said stationary and movable member assemblies through electrical means; the improvement comprising:

said sound-absorbing material is formed into an annular shape corresponding to said lower bearing surface of said cable containing chamber, said sound-absorbing material comprising a resilient base element made of a material selected from a foam rubber material, a resin foam material, and a rubber material; or a synthetic paper applied by means of an adhesive to a top and bottom surface of said resilient base element, said synthetic paper being produced by mixing a polypropylene resin with a reinforcing fiber and forming a biaxial extension film, said synthetic paper having a thickness in the range of 80 $\mu$m to 0.1 mm and having a smooth surface, said sound-absorbing material being attached to at least said lower bearing surface so that said flat cable slides on said sound-absorbing material.

2. In a cable reel for an automotive vehicle having a sound-absorbing material therein, wherein said cable reel has a stationary member assembly and a movable member assembly rotatably mounted on said stationary member assembly, said stationary and movable member assemblies defining a cable containing chamber having an annular configuration and upper and lower bearing surfaces, said cable containing chamber accommodating a flat cable in a coiled manner between said upper and lower bearing surfaces, opposite ends of said flat cable being led out from said stationary and movable member assemblies through electrical means; the improvement comprising:

said sound-absorbing material is formed into a plurality of straps each having a given width, said straps extending radially and being equally spaced apart from each other in a circumferential direction on said lower bearing surface of said cable containing chamber, said sound-absorbing material comprising a resilient base element made of a material selected from a foam rubber material, a resin foam material, or a rubber material; and a synthetic paper applied by means of an adhesive to a top and bottom surface of said resilient base element, said synthetic paper being produced by mixing a polypropylene resin with a reinforcing fiber and forming a biaxial extension film, said synthetic paper having a thickness in the range of 80 $\mu$m to 0.1 mm and having a smooth surface.

* * * * *